United States Patent [19]

Garrigos Ruiz

[11] Patent Number: 5,762,785

[45] Date of Patent: Jun. 9, 1998

[54] SWIMMING POOL FILTER

[75] Inventor: Robert Garrigos Ruiz, Sant Jaume de Llierca, Spain

[73] Assignee: Aplister, S.A., Sant Jaume De Llierca (Girona), Spain

[21] Appl. No.: 865,069

[22] Filed: May 29, 1997

[51] Int. Cl.$^6$ .................................................. B01D 29/13
[52] U.S. Cl. .......................... 210/169; 210/287; 210/288; 210/289; 210/416.2
[58] Field of Search .......................... 210/169, 287, 210/288, 289, 416.2

[56] References Cited

U.S. PATENT DOCUMENTS

| | | |
|---|---|---|
| 3,278,034 | 10/1966 | West ........................................ 210/169 |
| 3,420,376 | 1/1969 | Smith ....................................... 210/169 |
| 3,493,116 | 2/1970 | Edmiston ................................. 210/288 |
| 3,625,365 | 12/1971 | Armstrong et al. ..................... 210/288 |
| 4,105,555 | 8/1978 | Pease ....................................... 210/169 |

OTHER PUBLICATIONS

"Hayward S–200 High Rate Sand Filters", Hayward Pool Products, Inc. 1992.
"Hayward S–160T High Rate Sand Filters Systems", Pool Products, Inc. 1992.

Primary Examiner—Neil McCarthy
Assistant Examiner—Betsey J. Morrison
Attorney, Agent, or Firm—Jacobson, Price, Holman & Stern, PLLC

[57] ABSTRACT

A swimming pool filter including a cylindrical receptacle made of plastic material and casket-forming ends to which a valve head is coupled, the latter to be connected by conduits to a diffusor and a manifold located, respectively, at the top and bottom of the receptacle; the filter including sand as filtering material, and a buffer is located between the bottom of the receptacle and the manifold occupying a predetermined sand-free space, which buffer when subject to an inner overpressure that causes the receptacle to expand, prevents the sand from accumulating at the bottom of the receptacle, thus neutralizing the pressures that may act upon the manifold. The cylindrical wall of the receptacle is reinforced with a band made of a resistant material.

5 Claims, 2 Drawing Sheets

SWIMMING POOL FILTER

FIELD OF THE INVENTION

This invention relates to a swimming pool filter.

BACKGROUND OF THE INVENTION

Swimming pool water cleaning filters are widely known. Such a filter consists of a cylindrical receptacle with ends in the shape of caskets and connections for a water inlet and outlet, an upper cover, a support base or a plurality of support stands. Said receptacle houses silicious sand, diffusors and manifolds, as well as piping, all of which perform the cleaning operation.

The receptacle of said filter is generally made of stainless steel or of injection or blow molding plastic material (mainly polyester or polyethylene).

The filters provided with plastic receptacles must be thicker at their cylindrical side zones than at their end caskets in order to support inner pressures. It is difficult in receptacles made of blow-molded plastic, to locate the thicker zones correctly and for such thickness to be uniform.

SUMMARY OF THE INVENTION

A swimming pool filter, which is the object of the present invention, is provided with a highly resistant receptacle made of blow-molded plastic and which avoids the need to provide a greater thickness to the cylindrical wall, characterized in that the wall of the receptacle is peripherally reinforced with a band made of a resistant material, for example polyester with fiberglass filaments or a stainless steel hoop, said band being housed in a surrounding recess provided on said cylindrical wall.

By means of the above, a lighter, high resistant and more economic receptacle is achieved by reducing the plastic material used in its manufacture. The presence of said band also provides a filter receptacle of two different colors, which may be used as the manufacturer's identifying element. This type of filter, when subject to an inner overpressure, causes the receptacle to expand, which causes the sand to move peripherally towards the bottom of the receptacle where the sand accumulates. As said inner overpressure ceases, the wall of the receptacle tends to recover its initial shape and, as a result, the sand is pressed upwards from the bottom of the receptacle against the manifold which also exercises pressure on the upper zone of the receptacle. If said pressure changes repetitively the moment is reached when the accumulated pressure against the upper zone of the receptacle causes the cover to become disengaged from the mouth of the receptacle with resulting damage. Said cover may support the valve head.

In order to avoid the above-mentioned from happening, the wall of the receptacle must be provided with a greater thickness so as not to be out of shape; this greatly increases the overall cost of the filter.

It is an object of this invention to solve the above-mentioned problem without increasing the thickness of the wall of the receptacle. The receptacle may be blow molded with the subsequent savings in manufacturing costs.

To solve said problem, according to the invention a buffer means is provided between the bottom of the receptacle and the manifold which occupies a space in which the sand cannot penetrate, which prevents the sand from accumulating in said zone during the expansion of the receptacle and/or neutralizes the pressures due to the return of the receptacle to its initial shape.

The buffer means consists of a spongy open-cell block which soaks up water, becoming inert to pressures or a tapered hollow body with elastic walls, which when subject to the sand pressure becomes out of shape, thus neutralizing the pressure.

These and other features will become apparent from the following detailed description and the accompanying drawings which illustrate different embodiments given as non-limiting examples of this invention.

DESCRIPTION OF THE PREFERRED EMBODIMENTS

Figure 1:
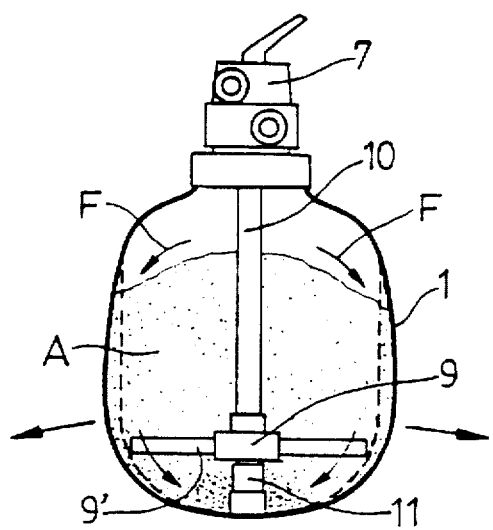
FIGS. 1 and 2 schematically show a conventional filter, during the expansion and recovery phases, respectively.

According to the drawings, the filter consists of a blow-molded plastic receptacle 1, made of blow-molded high-density polyethylene, which has a cylindrical wall and two opposing ends in the shape of caskets 2, 3, said cylindrical wall having a peripheral recess 4 which houses a reinforcing band 6 made of a fiberglass yarn winding embedded in polyester or consisting of a strip 6' of stainless steel, which avoids the provision of a wall of great thickness.

The upper mouth of the receptacle is closed by means of a threaded cover 5 which constitutes a valve head 7 with a control handle 8. A manifold 9 with arms 9' is located at the bottom of the receptacle 1 which is connected to and communicates with the head 7 by means of a tubular conduit 10. Said manifold rests at the bottom of the receptacle by means of a guide support 11.

The receptacle 1 houses siliceous sand A as filtering material.

The swimming pool water enters the filter through a valve head 7 mouth 12, which is distributed into the receptacle by a diffusor 13. The water percolates through the sand body and once filtered through the holes of the manifold 9 it reaches the axial conduit 10, coming out clean through the head mouth 14. If an excessive pressure is produced within the receptacle 1, the thinness of the wall of the receptacle causes the latter to expand, as shown in FIG. 1, making the sand to run peripherally, as shown by the arrows F, and to accumulate at the bottom of the receptacle.

Figure 2:
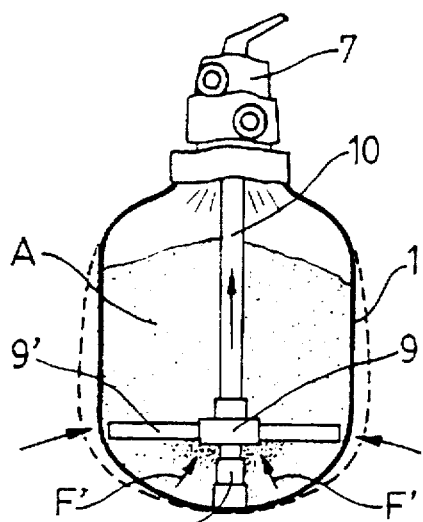

As the overpressure ceases, the receptacle 1 recovers its initial shape and the wall of the receptacle returns to its original state (FIG. 2). During said recovery, the sand accumulated at the bottom of the receptacle is forced to rise, as shown by the arrows F', the manifold 9 being pushed as a result and transmitting pressure through the conduit 10 against the head 7.

The successive expansions and contractions of the receptacle 1 increase the pressing action of the sand from the bottom upwards, thus producing such a force that causes the head to be disengaged from the mouth of the receptacle 1, causing damages to the filter.

Figure 3:
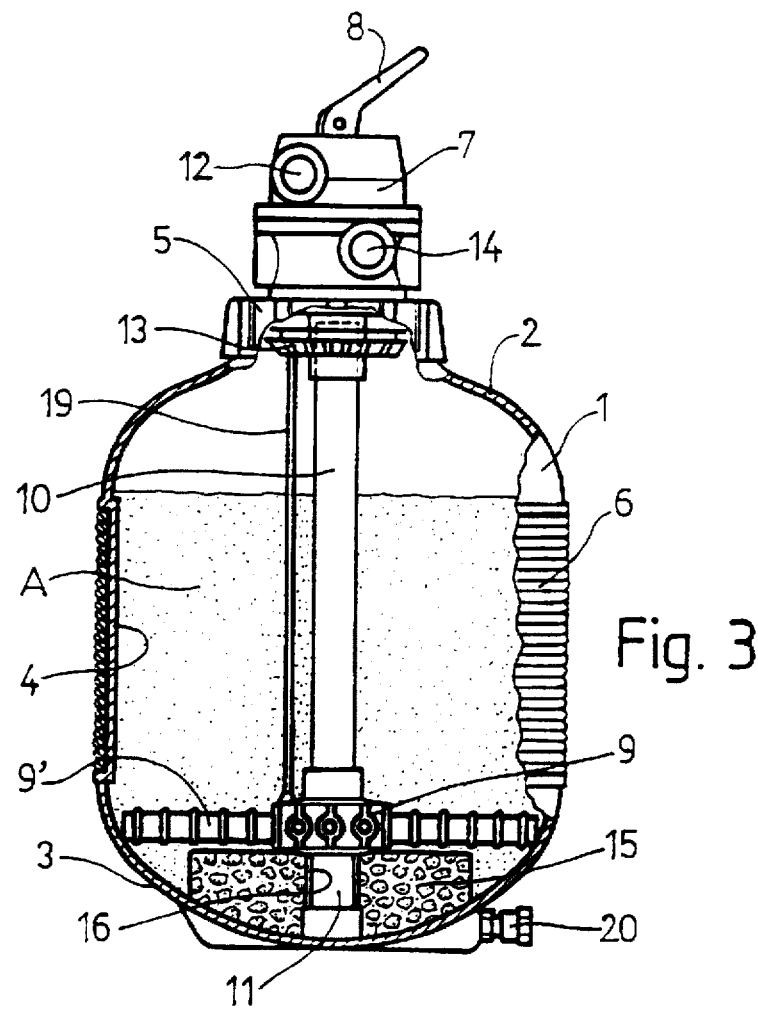
FIG. 3 is a front view, partly in section, of a filter provided with the pressure-inert buffer means.

In order to stabilize the sand volume the filter comprises a spongy open-cell block 15 (FIG. 3) between the manifold 9 and the bottom of the receptacle 1, the block becomes soaked with water, which makes it inert to the pressures acting thereon.

Therefore, said block 15 occupies a space where the sand cannot enter and is not affected by the pressures that could act on it, the manifold 9 thereby being free from pressures.

Said block 15 has a circular section with a hole 16 at its center through which the block is fitted over a guide support 11.

Figure 4:
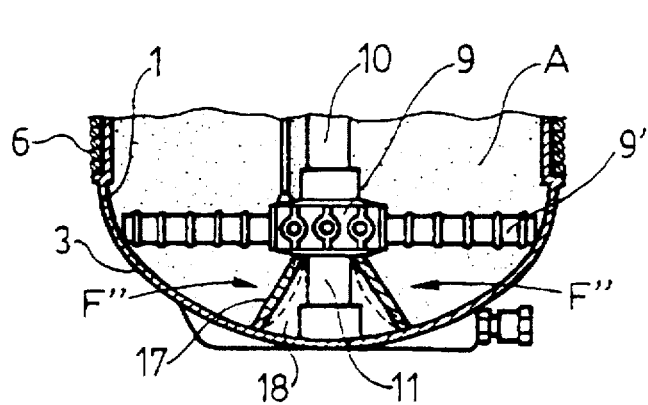
FIG. 4 is a sectional elevation view of the bottom of the filter provided with the pressure-neutralizing buffer means.
Figure 5:
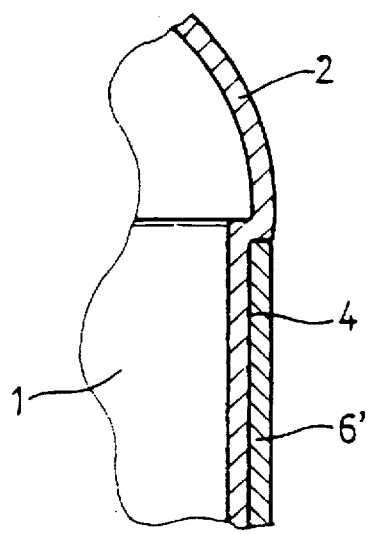
FIG. 5 shows in detail a sectional fragment of the wall of the receptacle.

FIG. 4 shows the buffer means in the shape of a hollow tapered body 17 made of semi-elastic material, fitted over said guide support 11 and located between the manifold 9 and the bottom of the receptacle 1. Said hollow tapered body 17 occupies a space 18 where the sand is prevented from entering and the elasticity of its walls allows, by means of deformation, to neutralize the pressures F" originated at the bottom of the receptacle 1 when the receptacle recovers its original shape following an expansion.

Reference numeral 19 indicates an automatic purging conduit, and reference numeral 20 indicates a manual purging nozzle. It should be understood that the filter will be completed with a pressure gauge 21 and other fixtures.

Figure 6:
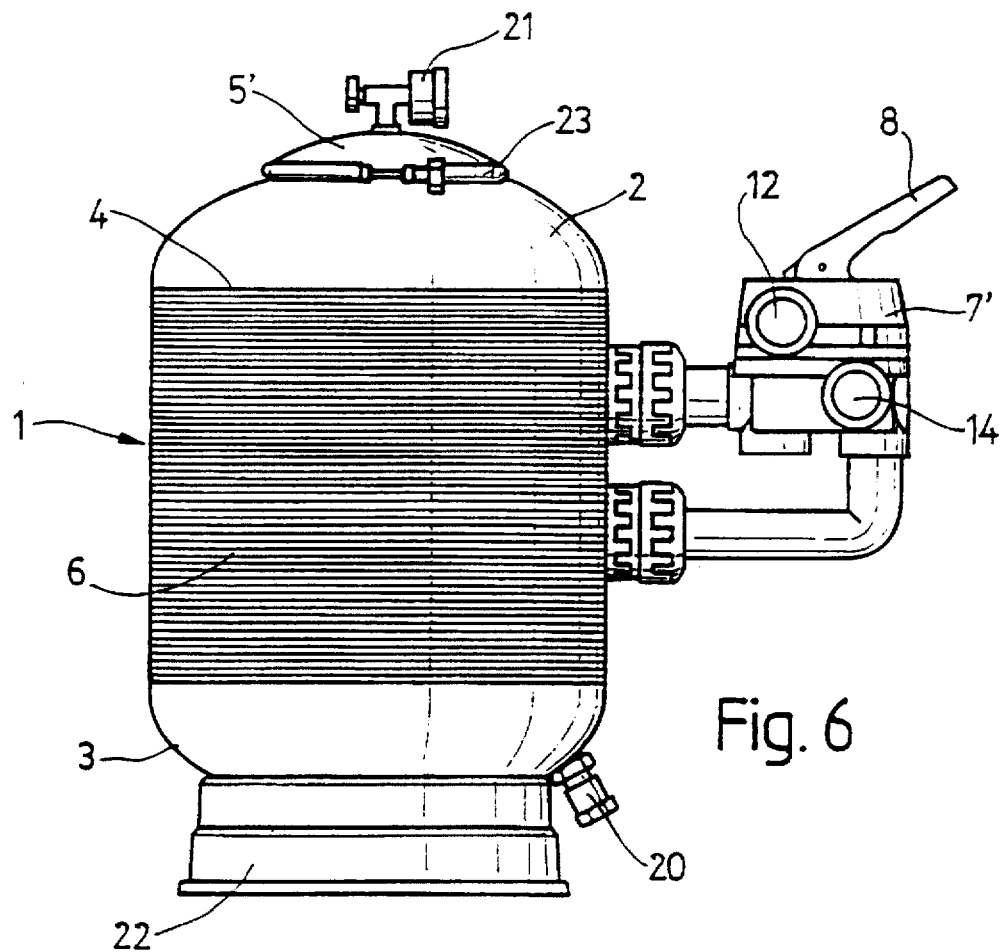
FIG. 6 is a front view of a modified embodiment of the filter of this invention.

In the embodiment of FIG. 6 the filter comprises a top cover 5' provided with a pressure gauge 21, and a support plate 22 resting on the floor, the valve head 7' being placed on the sidewall. The cover 5' is fixed to the upper mouth of the receptacle by means of a clamp 23.

While the best modes for carrying out the invention have been described in detail, those familiar with the art to which this invention relates will recognize various alternative embodiments for practicing the invention as defined by the following claims.

I claim:

1. A swimming pool filter comprising:

a cylindrical receptacle made of plastic material with ends in a shape of caskets to which a valve head is coupled, the valve head being connected by conduits to a diffusor and a manifold located, respectively, at a top and a bottom of the receptacle, a filter comprising sand as filtering material located in the receptacle, buffer means located between the bottom of the receptacle and the manifold occupying a predetermined sand-free space which, as inner overpressures cause the receptacle to expand, prevents the sand from accumulating at the bottom of the receptacle thus neutralizing the pressures that take place as the receptacle recovers its original shape when the inner overpressures cease to act, which pressures could cause a damaging force against the top of the receptacle, a cylindrical wall of the receptacle being reinforced with a band made of a pressure resistant material fitted into a recess provided on a periphery of the cylindrical wall.

2. A swimming pool filter according to claim 1, wherein the band embracing the cylindrical wall of the receptacle is made of polyester with fiberglass filaments.

3. A swimming pool filter according to claim 1, wherein the band embracing the cylindrical wall of the receptacle is a stainless steel hoop.

4. A swimming pool filter according to claim 1, wherein the buffer means consists of a spongy open-cell block which becomes soaked with water which makes the block inert to pressures.

5. A swimming pool filter according to claim 1, wherein the buffer means consists of a hollow tapered body with elastic walls which when subject to the pressures of the sand becomes out of shape and neutralizes said pressures.

* * * * *